United States Patent
Chaurasia et al.

(10) Patent No.: US 12,250,159 B2
(45) Date of Patent: Mar. 11, 2025

(54) RATE PROPORTIONAL SCHEDULING TO REDUCE PACKET LOSS IN VIRTUALIZED NETWORK FUNCTION CHAINS

(71) Applicant: VMWARE, INC., Palo Alto, CA (US)

(72) Inventors: Avinash Kumar Chaurasia, Prayagraj (IN); Lan Vu, Palo Alto, CA (US); Uday Pundalik Kurkure, Los Altos Hills, CA (US); Hari Sivaraman, Livermore, CA (US); Sairam Veeraswamy, Coimbatore (IN)

(73) Assignee: VMware LLC, Palo Alto, CA (US)

( * ) Notice: Subject to any disclaimer, the term of this patent is extended or adjusted under 35 U.S.C. 154(b) by 247 days.

(21) Appl. No.: 17/974,575

(22) Filed: Oct. 27, 2022

(65) Prior Publication Data

US 2024/0015107 A1    Jan. 11, 2024

(30) Foreign Application Priority Data

Jul. 11, 2022    (IN) .............................. 202241039745

(51) Int. Cl.
  *G06F 15/173*    (2006.01)
  *H04L 47/11*    (2022.01)
  *H04L 47/30*    (2022.01)
  *H04L 47/50*    (2022.01)

(52) U.S. Cl.
  CPC .............. *H04L 47/30* (2013.01); *H04L 47/11* (2013.01); *H04L 47/58* (2013.01)

(58) Field of Classification Search
  CPC ...................................................... H04L 47/11
  See application file for complete search history.

(56) References Cited

U.S. PATENT DOCUMENTS

| | | | |
|---|---|---|---|
| 2014/0146666 A1* | 5/2014 | Kwan | H04L 47/12 370/230 |
| 2020/0028787 A1* | 1/2020 | Mehra | H04L 47/30 |
| 2022/0311711 A1* | 9/2022 | Jepsen | H04L 47/27 |
| 2023/0020027 A1* | 1/2023 | Buyukdura | H04W 28/16 |
| 2023/0336487 A1* | 10/2023 | Wang | H04L 47/2441 |

* cited by examiner

*Primary Examiner* — Padma Mundur
(74) *Attorney, Agent, or Firm* — King Intellectual Asset Management (57) ABSTRACT

Disclosed are various embodiments for rate proportional scheduling to reduce packet loss in virtualized network function chains. A congestion monitor executed by a first virtual machine executed by a host computing device can detect congestion in a receive queue associated with a first virtualized network function implemented by a first virtual machine. The congestion monitor can send a pause signal to a rate controller executed by a second virtual machine executed by the host computing device. The rate controller can receive the pause signal. In response, the rate controller can pause the processing of packets by a second virtualized network function implemented by the second virtual machine to reduce congestion in the receive queue of the first virtualized network function.

20 Claims, 6 Drawing Sheets

RATE PROPORTIONAL SCHEDULING TO REDUCE PACKET LOSS IN VIRTUALIZED NETWORK FUNCTION CHAINS

RELATED APPLICATIONS

Benefit is claimed under 35 U.S.C. 119(a)-(d) to Foreign Application Serial No. 202241039745 filed in India entitled "RATE PROPORTIONAL SCHEDULING TO REDUCE PACKET LOSS IN VIRTUALIZED NETWORK FUNCTION CHAINS", on Jul. 11, 2022, by VMware, Inc., which is herein incorporated in its entirety by reference for all purposes.

BACKGROUND

Virtualization-aware hardware, such as virtualization aware accelerator cards (e.g., virtualization aware GPUs), often does not expose preemption control to the users of the accelerator cards. At the same time, scheduling algorithms for the virtualized hardware (e.g., virtualized GPUs) often works in a round-robin or similar manner with a non-configurable time slice duration. The lack of preemption control and non-configurable scheduling algorithms limits the users of the virtualized hardware from employing custom scheduling policies.

Moreover, virtualized network functions are often deployed in chains, with each virtualized network function hosted within its own virtual machine on a host computing device. These virtualized network functions often have heterogenous compute requirements. In these setups, round-robin scheduling that equally shares the virtualized hardware (e.g., a GPU) among all of the virtual machines implementing virtualized network functions results in packet loss and low throughput as some virtualized network functions process packets more quickly than others.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for rate proportional scheduling to reduce packet loss in virtualized network function chains. Network functions in a service function chain often have heterogenous compute requirements. Round-robin scheduling algorithms used to allocate resources for virtualized hardware often fail to take the computer heterogenity of virtualized network functions into account, giving an equal time slot of a host's hardware accelerator card (e.g., a GPU) to each virtualized accelerator card (e.g., virtualized GPU) allocated to each virtual machine installed on the host.

The compute heterogenity of the virtualized network functions arises due to the differences in the per-packet processing time of each virtualized network function. The lower the per-packet processing time, the higher the throughput. Round-robin scheduling in a service function chain where a slower virtualized network function is downstream of a faster virtualized network function results in packet loss—as the receive queue of the downstream virtualized network function accumulates packets at faster rate than the downstream virtualized network function can process them, the receive queue will eventually overflow and packets will be dropped or otherwise lost. Moreover, because the lost packets have already been processed by upstream virtualized network functions, the processing resources expended by the upstream virtualized network functions are effectively wasted.

To prevent packet loss due to the round-robin scheduling of virtualized hardware resources, various embodiments of the present disclosure identify congested network functions and coordinate the rate at which packets are forwarded between the network functions. Each virtual machine implementing a network function can include a congestion monitor and a rate controller. When a downstream congestion monitor detects that a receive queue is in danger of overflowing with packets, the downstream congestion monitor can notify an upstream rate controller to decrease the rate at which it forwards packets to the upstream virtualized network function. Because the upstream network function is processing fewer packets, more time-slices for the virtualized hardware are available to be used by the downstream network function. As a result, the downstream network function receives fewer network packets, decreasing the risk of packet loss due to a full receive queue, and has additional resources to process the packets currently stored in the receive queue, allowing the downstream virtualized network function to resolve the congestion.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
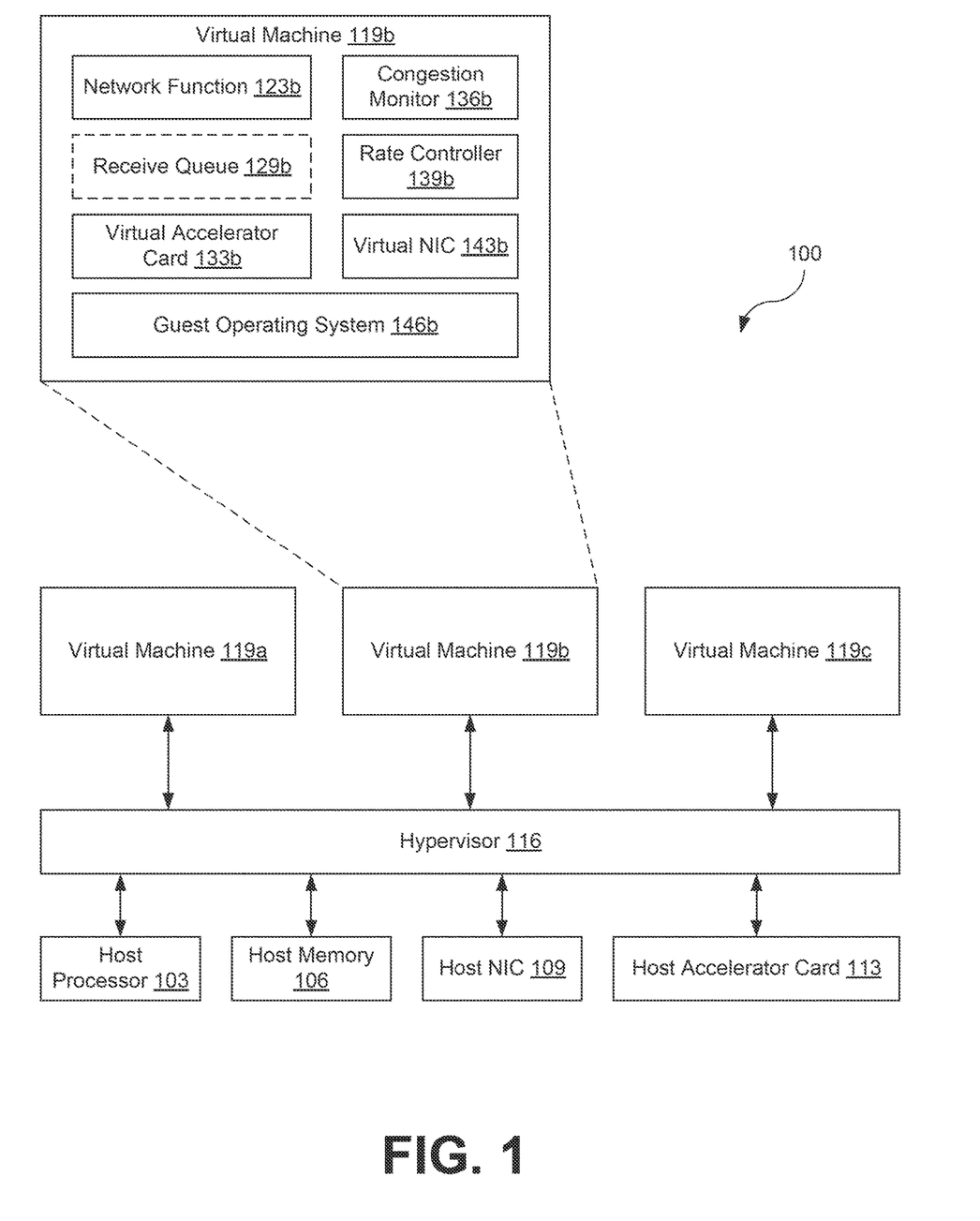
FIG. 1 is a schematic block drawing of a host computing device according to various embodiments of the present disclosure.

FIG. 1 is a schematic block diagram of a host computing device 100 according to various embodiments of the present disclosure. The host computing device 100 can include one or more host processors 103, host memory 106, one or more host network interface controllers (NICs) 109, and/or one or more host accelerator cards 113. A hypervisor 116 can be installed on the host computing device 100 to orchestrate the management and execution of one or more virtual machines 119 by the host computing device 100.

The host processor 103 can represent one or more processing circuits that can be used to execute the machine-readable instructions of the hypervisor 116 and the virtual machines 119 installed on the host computing device 100. Examples of host processors 103 can include general purposes processors such as central processing units (CPUs). Moreover, each host processor 103 can include one or more cores that can be used to execute threads or processes in parallel.

The host memory 106 can represent the memory of the host computing device 100 where machine-readable instructions for the hypervisor 116 or the virtual machines 119 can be stored. The host memory 106 includes both volatile and nonvolatile memory and data storage components. Volatile components are those that do not retain data values upon loss of power. Nonvolatile components are those that retain data upon a loss of power. Thus, the host memory 106 can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

The host NIC 109 can represent a network interface that provide network connectivity to the host computing device 100.

The host accelerator cards 113 can represent various processors that are designed to perform specific workloads or operations at higher speed and efficiency compared to general purpose processors such as CPUs. Examples of accelerator cards can include graphics processing units (GPUs) such as NVIDIA or AMD graphics processing cards, cryptographic processing cards, physics processing cards, network processing cards, machine learning accelerators such as GOOGLE's Tensor Processing Unit (TPU), digital signal processors (DSPs), etc. In many instances, the host accelerator card 113 can be implemented as an application specific integrated circuit (ASIC). However, in some instances, host accelerator cards 113 may be capable of general purpose computation (e.g., general purpose graphics processing unit (GPGPU) application programming) using specialized software development frameworks (e.g., NVIDIA's CUDA parallel computing platform, the OPENCL application programming framework, MICROSOFT's DIRECTCOMPUTE application programming interface (API), etc.). In some implementations, a host accelerator card 113 could be configured for use in a virtualization environment. For example, the host accelerator card 113 could be designed to allow multiple virtual machines 119 to share the resources of the host accelerator card 113.

Access to the host accelerator card 113 can be allocated among the virtual machines 119 according to various approaches. For example, access to the host accelerator card 113 could be divided into time slices. Each time slice could be allocated on a round-robin basis to those virtual machines 119 that are attempting to use the host accelerator card 113. For example, if three virtual machines 119 each attempted to launch a single NVIDIA CUDA kernel for a GPGPU application (e.g., a virtualized network function 123 implemented using a GPGPU software framework) on their respective virtualized GPU, then each time-slice for the host GPU could be allocated evenly between the three virtual machines 119, with each virtual machine 119 receiving one-third of the available time slices of the host GPU. If one of the virtual machines 119 were to pause execution of its GPGPU application, then the available time slices would be reallocated between the remaining two virtual machines 119, allowing their GPGPU applications to execute more quickly due to the availability of the additional time slices. However, if one of the virtual machines 119 were to launch five NVIDIA CUDA kernels for a GPGPU application, while the other two virtual machines 119 were to launch a single NVIDIA CUDA kernel for their GPGPU applications, the first virtual machine 119 could be allocated five-sevenths of the available time slices of the host GPU while the remaining two virtual machines 119 would each be allocated only one-seventh of the available time slices of the host GPU.

The hypervisor 116, which may sometimes be referred to as a virtual machine monitor (VMM), is an application or software stack that allows for creating and running virtual machines 119. Accordingly, a hypervisor 116 can be configured to provide guest systems with a virtual operating platform, including virtualized hardware devices or resources, and manage the execution of guest operating systems within a virtual machine execution space provided by the hypervisor 116. In some instances, a hypervisor 116 may be configured to run directly on the hardware of the host computing device 100 in order to control and manage the hardware resources of the host computing device 100 provided to the virtual machines 119 resident on the host computing device 100. For example, the hypervisor 116 could be responsible for allocated time slices for the usage of a host accelerator card 113 (e.g., a host GPU) to virtual machines 119 that request or require access to the resources of the host accelerator card 113. In other instances, the hypervisor 116 can be implemented as an application executed by an operating system executed by the host computing device 100, in which case the virtual machines 119 may run as a thread, task, or process of the hypervisor 116 or operating system. Depending on the implementation, the hypervisor 116 could provide full virtualization for system virtual machines, or operating-system level virtualization for isolated processes that act as virtual machines. Examples of different types of hypervisors 116 include ORACLE VM SERVER™, MICROSOFT HYPER-V®, VMWARE ESX™ and VMWARE ESXi™, VMWARE WORKSTATION™, VMWARE PLAYER™, and ORACLE VIRTUALBOX®.

The virtual machines 119 can represent software emulations of computer systems. Accordingly, a virtual machine 119 can provide the functionality of a physical computer sufficient to allow for installation and execution of an entire operating system and any applications that are supported or executable by the operating system. As a result, a virtual machine 119 can be used as a substitute for a physical machine to execute one or more processes. In full virtualization implementations, the virtual machine 119 can be implemented as a system virtual machine that emulates a complete host. In operating-system virtualization implementations, the virtual machine 119 can be implemented as an isolated user-space instance or process, which may be referred to as containers, zones, virtual environments, virtual kernels, or jails. Accordingly, in various embodiments of the present disclosure, each virtual machine 119 can include a virtualized network function 123, a receive queue 129, a virtual accelerator card 133, a congestion monitor 136, a rate controller 139, a virtual NIC 143, and a guest operating system 146.

A virtualized network function 123 represents a virtualized implementation of a network function. A network function is a functional building block within a network infrastructure, such as a node in a network. Examples of network functions include virtual private network (VPN) endpoints, intrusion detection system (IDS) endpoints, firewall systems, routers, etc. Often, network functions are served by physical devices, sometimes utilizing ASICs designed for the task. However, multiple network functions can be deployed on a services on a single device, such as a consumer firewall or wireless router that provides router, firewall, and VPN functions on the same device.

Accordingly, a virtualized network function 123 could be programmed to perform the operations of a network function as virtualized service or in a virtualized environment (e.g., as a service hosted by a virtual machine 119). For example, the virtualized network function 123 could represent a routing service, an intrusion detection system or service, a VPN endpoint, a firewall service, etc. In order to increase the throughput or processing speed of the virtualized network function 123, the virtualized network function 123 could be programmed or implemented to make use of the virtual accelerator card 133 of the virtual machine 133. For example, a virtualized network function 123 could be programmed using GPGPU frameworks to take advantage of the parallel processing performance of a GPU installed on the host computing device 100. As another example, a virtualized network function 123 could be programmed to take advantage of the high performance of a cryptographic accelerator installed on the host computing device 100 in order to increase the throughput of encrypting or decrypting network packets.

A receive queue 129 can represent a memory descriptor or address of the memory of the virtual machine 119, which can be used to store packets received by the virtual NIC 143 for further processing. When the virtual NIC 143 receives data, it can write the received data to the memory of the virtual machine and then add the memory address or descriptor representing the location where the data was stored to the receive queue 129. In order to manage resource consumption, the receive queue 129 could be limited to the number of memory addresses or descriptors that can be stored in the receive queue 129.

A virtual accelerator card 133 can represent an abstract, virtualized version of an accelerator card that provides the virtual machine 119 with access to the physical resources of the host accelerator card 113. The virtual machine 119 could access or interact with the virtual accelerator card 133 in order to make use of or benefit from the functionality provided by the host accelerator card 113. For example, in order to provide a virtual machine 119 with the processing capabilities of a GPU, a virtualized GPU could be made available to the virtual machine 119. When the virtual machine 119 utilizes the virtualized GPU, the instructions are executed by the host GPU and the results returned to the virtual machine 119 through the virtualized GPU.

A congestion monitor 136 is an application that can be executed by the virtual machine 119 to monitor the state of the receive queue 129 of the virtual machine 119 in order to determine if the resource queue 129 has too many packets (indicating congestion) or too few packets (indicating starvation) stored in the receive queue 129. When the congestion monitor 136 determines that the number of packets stored in the receive queue 129 exceeds a predefined threshold, the congestion monitor 136 can conclude that the virtualized network function 123 is unable to process packets quickly enough to match the flow of packets being received, indicating that the virtualized network function 123 is experiencing congestion. Similarly, when the congestion monitor 136 determines that the number of packets stored in the receive queue 129 is less than a predefined threshold, the congestion monitor 136 could conclude that the virtualized network function 123 is processing packets too quickly or is not receiving packets quickly enough. In either of these situations, the congestion monitor 136 could send a signal to an upstream source of packets (e.g., the rate controller 139 of another virtual machine 119 whose virtualized network function 123 is sending packets which are being stored in the receive queue 129) to increase or decrease the rate at which packets are being sent.

A rate controller 139 is an application that can be executed by the virtual machine 119 for forward packets from the receive queue 129 of the virtual machine 119 to the virtualized network function 123 executed or implemented by the virtual machine 119. The rate controller 139 can be configured to increase or decrease the rate at which it forwards packets from the receive queue 129 to the virtualized network function 123 in response to messages received from downstream congestion monitors 136. In some implementations, the rate controller 139 could be configured to operate in a simple, binary manner. In these implementations, the rate controller 139 is either forwarding packets from the receive queue 129 to the virtualized network function 123 as fast as the virtualized network function 123 can process them, or the rate controller 139 is not forwarding any packets to the virtualized network function 123. In other implementations, the rate controller 139 can be configured to forward packets from the receive queue 129 to the virtualized network function 123 at variable levels. For example, the rate controller 139 could provide several intermediate levels between maximum speed and a complete cessation or pause of forwarding packets. In these implementations, the rate controller 139 could adjust between speed levels in response to messages received from downstream congestion monitors 136.

A virtual NIC 143 can represent an abstract, virtualized version of a network interface card that provides the virtual machine 119 with access to the physical resources of the host NIC 109. The virtual NIC 143 allows for the virtual machine 119 to send and receive packets through a network connection provided by the host NIC 109. Some or all of the packets received by the virtual NIC 143 can be stored in the receive queue 129 of the virtual machine 119. For example, packets received from a virtual machine 119 hosting an upstream virtualized network function 123 could placed in the receive queue 129, while packets from other sources could be processed by other applications or systems.

Guest Operating System 146

Figure 2:
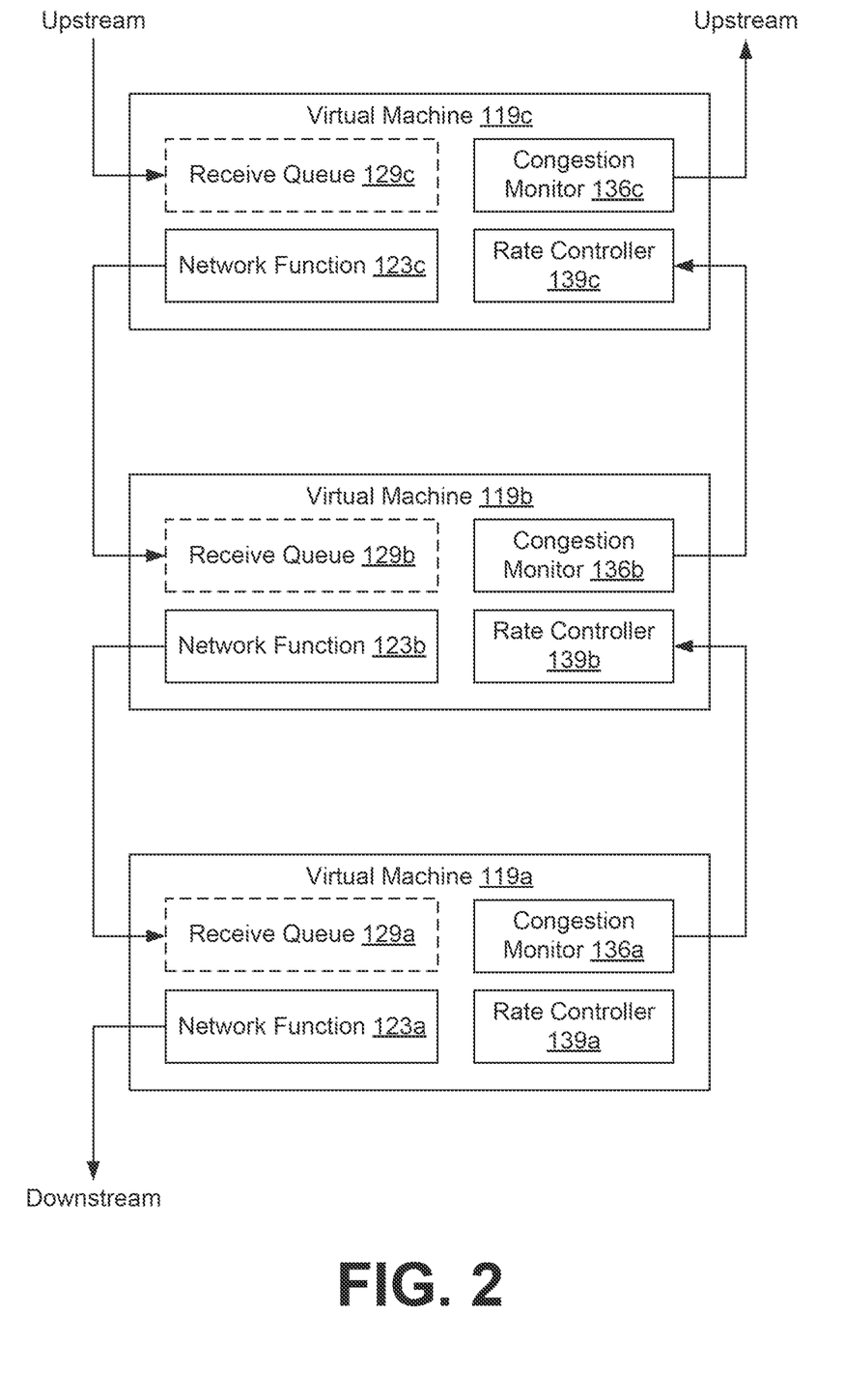
FIG. 2 is an example illustration of how virtualized network functions can be chained together to process packets.

FIG. 2 shows an example of multiple virtual machines 119 whose virtualized network functions 123 are arranged in a directed, acyclic graph (e.g., a chain). This allows for individual packets to be sequentially processed by specific virtual machines 119 before being sent to a final destination.

As shown, data or packets from upstream (e.g., originally received by the host NIC 109 or forwarded from another virtualized network function 123 of another virtual machine 119) are received by the virtual NIC 143c of the virtual machine 119c and place in the receive queue 129c of the virtual machine 119c. The rate controller 139c forwards packets from the receive queue 129c to the virtualized network function 123c for processing. The virtualized network function 123c can then process the packets and forward the processed packets onto the next virtual machine 119b, which will place the received packets in the receive queue 129b. The rate controller 139b can then forward the packets from the receive queue 129b to the virtualized network function 123b for processing. The virtualized network function 123b can then process the packets and forward the processed packets onto the next virtual machine 119a, which will place the received packets in the receive queue 129a. The rate controller 139a can then forward the packets from the receive queue 129a to the virtualized network function 123a for processing. The virtualized network function 123b can then process the packets and forward the processed packets downstream (e.g., to another virtual machine 119 for further processing with a respective virtualized network function 123 or to a final destination of the packet). In order to prevent buffer overflows or underflows, each virtual machine 119 can also execute a congestion monitor 136.

If the congestion monitor 136 detects that the receive queue 129 is in danger of overflowing (e.g., because the number of packets in the receive queue is greater than or equal to a predefined threshold value), then the congestion monitor 136 can send a pause signal or decelerate signal to the upstream rate controller 139. For example, if too many packets are stored in the receive queue 129a, the congestion monitor 136a could detect the overage and send a pause signal or decelerate signal to the rate controller 139b of the virtual machine 119b upstream. Likewise, if too many packets are stored in the receive queue 129b, the congestion monitor 136b could detect the overage and send a pause signal or decelerate signal to the rate controller 139c of the virtual machine 119c upstream.

Similarly, if the congestion monitor 136 detects that the receive queue 129 is in danger of underflowing (e.g., because the number of packets in the receive queue is less than or equal to a predefined threshold value), then the congestion monitor 136 can send a resume signal or accelerate signal to the upstream rate controller 139. For example, if too few packets are stored in the receive queue 129a, the congestion monitor 136a could detect the starvation or underflow condition and send a resume signal or accelerate signal to the rate controller 139b of the virtual machine 119b upstream. Likewise, if too few packets are stored in the receive queue 129b, the congestion monitor 136b could detect the starvation or underflow and send a resume signal or accelerate signal to the rate controller 139c of the virtual machine 119c upstream.

Figure 3:
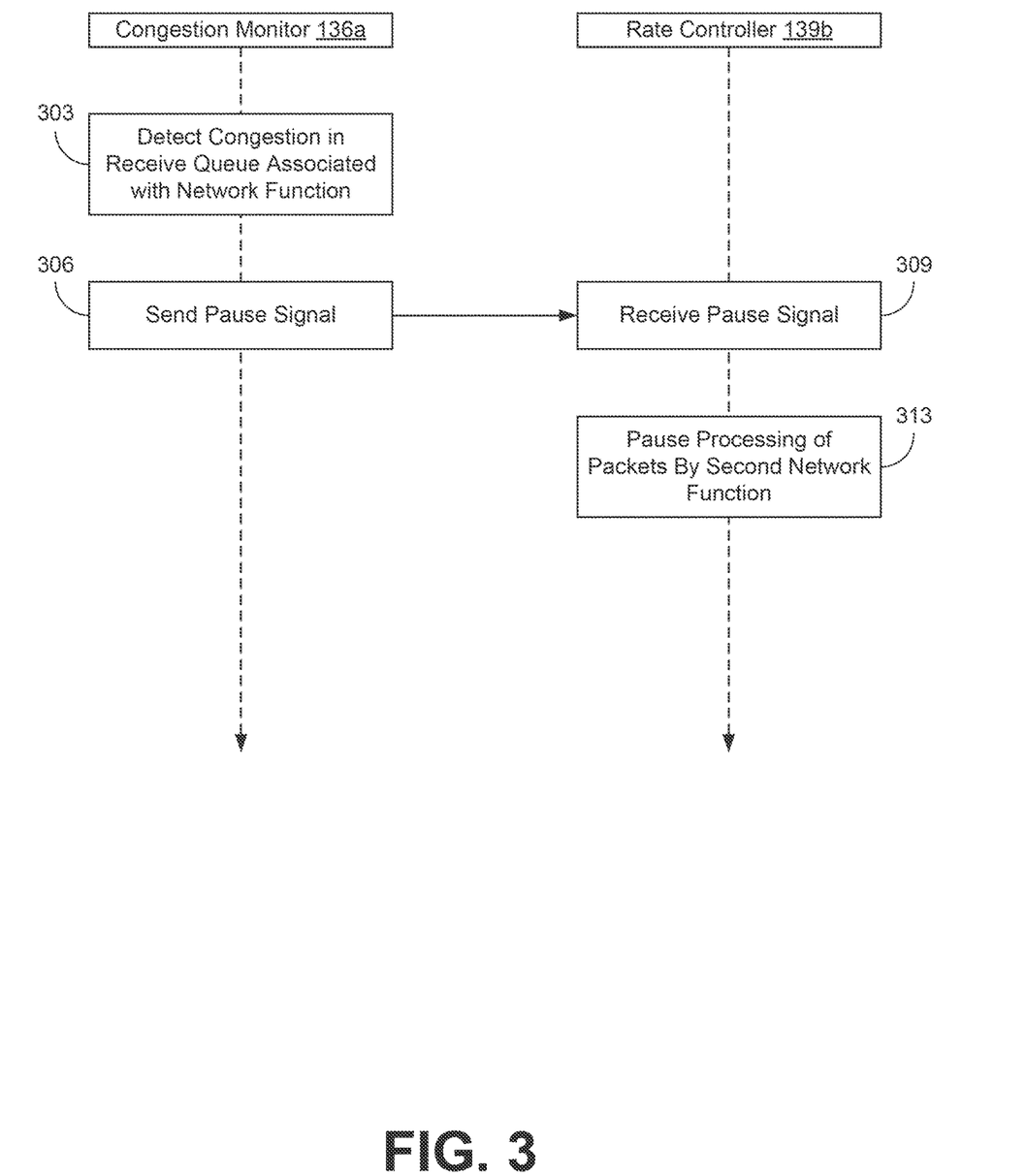
FIGS. 3-6 are sequence diagrams illustrating examples of functionality implemented in the host computing device of FIG. 1 according to various embodiments of the present disclosure.

Referring next to FIG. 3, shown is a sequence diagram that provides one example of the interactions between the congestion monitor 136a of a first virtual machine 119a and a rate controller 139b of a second virtual machine 119b. The sequence diagram of FIG. 3 provides merely an example of the many different types of functional arrangements that can be employed to implement the interactions the congestion monitor 136a of a first virtual machine 119a and a rate controller 139b of a second virtual machine 119b. As an alternative, the sequence diagram of FIG. 3 can be viewed as depicting an example of elements of a method implemented within the host computing device 100.

Beginning with block 303, the congestion monitor 136a of a first virtual machine 119a a can detect congestion in the receive queue 129a associated with a virtualized network function 123a implemented by the virtual machine 119a. For example, the congestion monitor 136a could periodically evaluate the receive queue 129a to determine the number of packets currently stored in the receive queue 129a. If the number of packets is greater than a predefined threshold value, the congestion monitor 136a could determine that the receive queue 129a is becoming congested.

In response to detecting congestion in the receive queue 129a, the congestion monitor 136a could send a pause signal to the rate controller 139b of a second virtual machine 119b at block 306. The pause signal could be any signal or message that, when received by the rate controller 139b of the second virtual machine 119b, would cause the rate controller 139b to pause forwarding of packets from the receive queue 129b of the second virtual machine 119b to the virtualized network function 123b of the second virtual machine 119b. The pause signal could be sent using any one of a number of interprocess or inter-virtual machine communications mechanism. For example, the congestion monitor 136a could send a network packet or message through the virtual NIC 143a, which the hypervisor 116 could directly route of forward to the virtual NIC 143b of the second virtual machine 119b.

Accordingly, at block 309, the rate controller 139b executing on the second virtual machine 119b could receive the pause signal sent by the congestion monitor 136a of the first virtual machine 119a.

In response to receiving the pause signal at block 309, the rate controller 139b could, at block 313, stop forwarding packets from the receive queue 129b of the second virtual machine 119b to the virtualized network function 123b implemented by the second virtual machine 119b. By withholding packets from the virtualized network function 123b, the virtualized network function 123b will cease to use computing resources (e.g., by failing to spawn threads or kernels to process the packets). As a result, time slices or other computational resources that would be allocated to the virtualized network function 123b will be reallocated to other virtualized network functions 123 hosted on other virtual machines 119, thereby causing those other virtual machines 119 to more quickly process packets stored in their respective receive queues 129.

Figure 4:
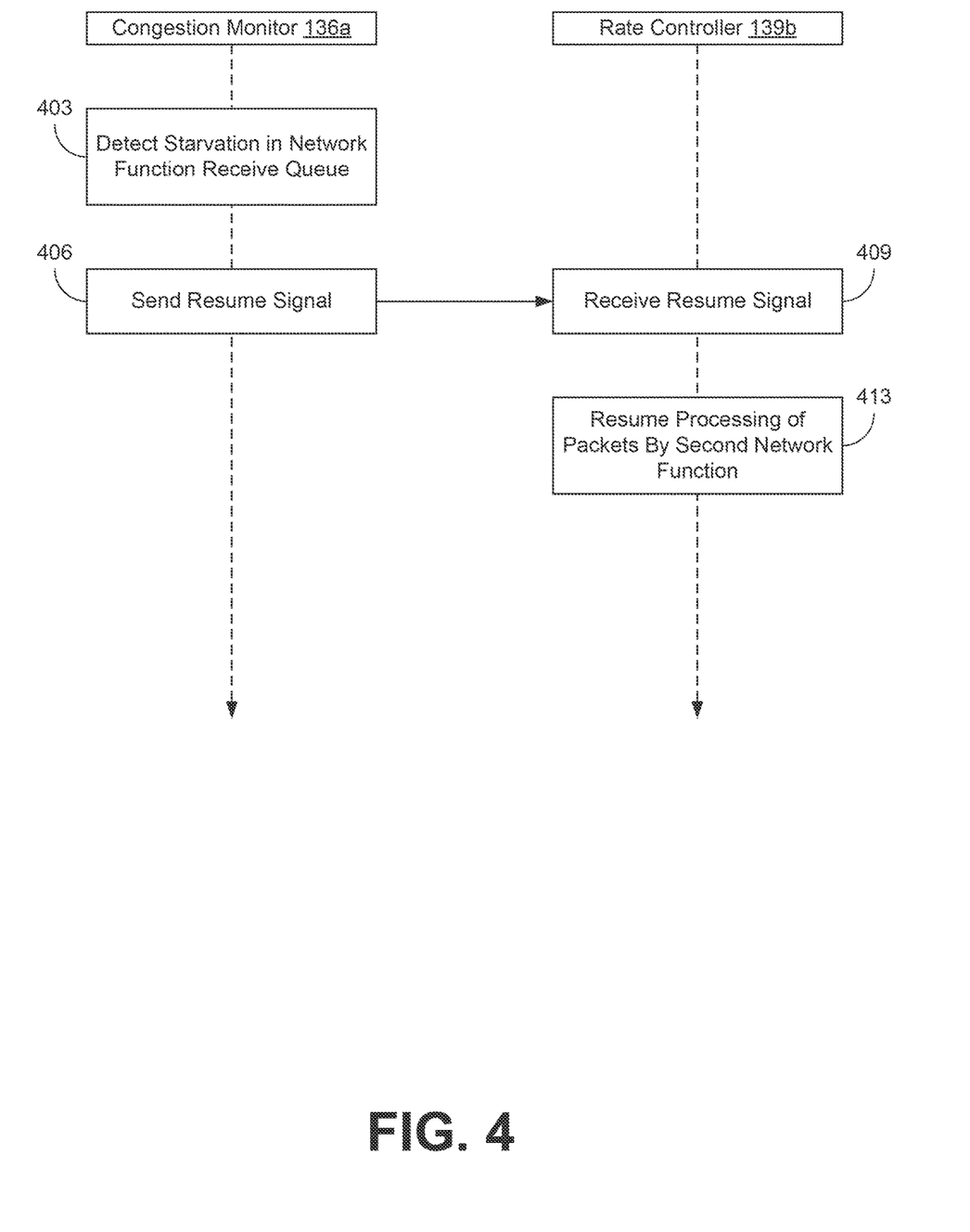

Referring next to FIG. 4, shown is a sequence diagram that provides one example of the interactions between the congestion monitor 136a of a first virtual machine 119a and a rate controller 139b of a second virtual machine 119b. The sequence diagram of FIG. 4 provides merely an example of the many different types of functional arrangements that can be employed to implement the interactions the congestion monitor 136a of a first virtual machine 119a and a rate controller 139b of a second virtual machine 119b. As an alternative, the sequence diagram of FIG. 4 can be viewed as depicting an example of elements of a method implemented within the host computing device 100.

Beginning with block 403, the congestion monitor 136a of a first virtual machine 119 a can detect a starvation condition in the receive queue 129a associated with a virtualized network function 123a implemented by the virtual machine 119a. For example, the congestion monitor 136a could periodically evaluate the receive queue 129a to determine the number of packets currently stored in the receive queue 129a. If the number of packets is lean than a predefined threshold value, the congestion monitor 136a could determine that the receive queue 129a is suffering from starvation.

In response to detecting starvation in the receive queue 129a, the congestion monitor 136a could send a resume signal to the rate controller 139b of a second virtual machine 119b at block 406. The resume signal could be any signal or message that, when received by the rate controller 139b of the second virtual machine 119b, would cause the rate controller 139b to resume the forwarding of packets from the receive queue 129b of the second virtual machine 119b to the virtualized network function 123b of the second virtual machine 119b. The resume signal could be sent using any one of a number of interprocess or inter-virtual machine communications mechanism. For example, the congestion monitor 136a could send a network packet or message through the virtual NIC 143*a*, which the hypervisor 116 could directly route of forward to the virtual NIC 143*b* of the second virtual machine 119*b*.

Accordingly, at block 409, the rate controller 139*b* executing on the second virtual machine 119*b* could receive the resume signal sent by the congestion monitor 136*a* of the first virtual machine 119*a*.

In response to receiving the resume signal at block 409, the rate controller 139*b* could resume forwarding packets from the receive queue 129*b* of the second virtual machine 119*b* to the virtualized network function 123*b* of the second virtual machine 119*b*. By forwarding packets from to virtualized network function 123*b*, the virtualized network function 123*b* will resume using computing resources (e.g., by spawning additional threads or kernels to process the packets). As a result, time slices or other computational resources that would be allocated to other virtualized network functions 123 of other virtual machines 119 will be reallocated to the virtualized network function 123*b*. As a result, other virtualized network functions 123 of other virtual machines 119 will slow while the virtualized network function 123*b* of the virtual machine 119*b* will resume forwarding packets to the receive queue 129*a* of the virtual machine 119*a*.

Figure 5:
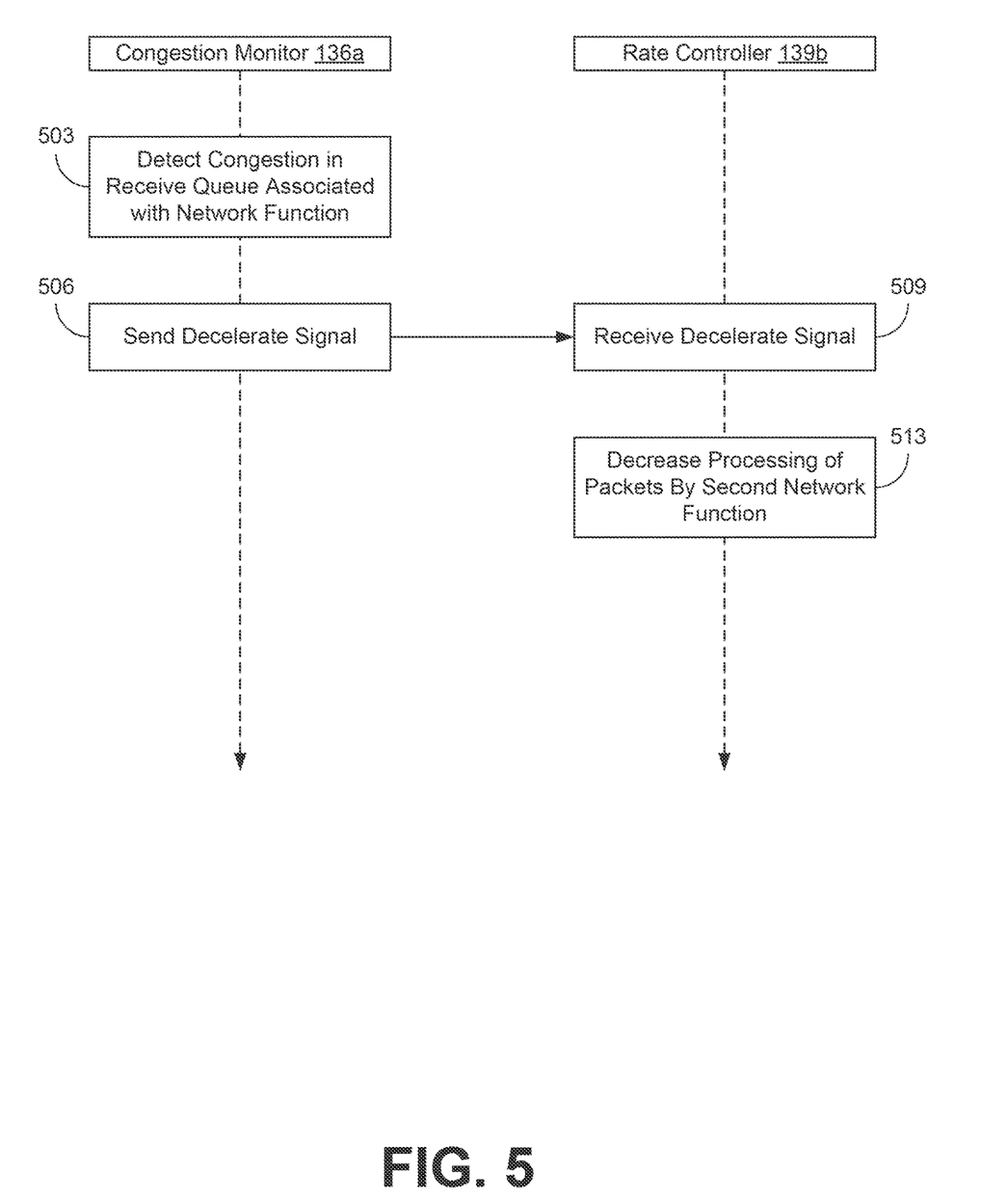

Referring next to FIG. 5, shown is a sequence diagram that provides one example of the interactions between the congestion monitor 136*a* of a first virtual machine 119*a* and a rate controller 139*b* of a second virtual machine 119*b*. The sequence diagram of FIG. 5 provides merely an example of the many different types of functional arrangements that can be employed to implement the interactions the congestion monitor 136*a* of a first virtual machine 119*a* and a rate controller 139*b* of a second virtual machine 119*b*. As an alternative, the sequence diagram of FIG. 5 can be viewed as depicting an example of elements of a method implemented within the host computing device 100.

Beginning with block 503, the congestion monitor 136*a* of a first virtual machine 119 a can detect congestion in the receive queue 129*a* associated with a virtualized network function 123*a* implemented by the virtual machine 119*a*. For example, the congestion monitor 136*a* could periodically evaluate the receive queue 129*a* to determine the number of packets currently stored in the receive queue 129*a*. If the number of packets is greater than a predefined threshold value, the congestion monitor 136*a* could determine that the receive queue 129*a* is becoming congested.

In response to detecting congestion in the receive queue 129*a*, the congestion monitor 136*a* could send a decelerate signal to the rate controller 139*b* of a second virtual machine 119*b* at block 506. The decelerate signal could be any signal or message that, when received by the rate controller 139*b* of the second virtual machine 119*b*, would cause the rate controller 139*b* to decrease the rate at which packets are forwarded from the receive queue 129*b* of the second virtual machine 119*b* to the virtualized network function 123*b* of the second virtual machine 119*b*. The decelerate signal could be sent using any one of a number of interprocess or inter-virtual machine communications mechanism. For example, the congestion monitor 136*a* could send a network packet or message through the virtual NIC 143*a*, which the hypervisor 116 could directly route of forward to the virtual NIC 143*b* of the second virtual machine 119*b*.

Accordingly, at block 509, the rate controller 139*b* executing on the second virtual machine 119*b* could receive the decelerate signal sent by the congestion monitor 136*a* of the first virtual machine 119*a*.

In response to receiving the decelerate signal at block 509, the rate controller 139*b* could, at block 513, decrease the rate at which it forwards packets from the receive queue 129*b* of the second virtual machine 119*b* to the virtualized network function 123*b* implemented by the second virtual machine 119*b*. For example, if the rate controller 139*b* offered different rates at which it forwarded packets from the receive queue 129*b*, then the rate controller 139*b* could move from a current rate of forwarding to a lower rate of forwarding. For example, the rate controller 139*b* could offer several different rates of forwarding (e.g., once every ten processor cycles, once every twenty processor cycles, once every thirty processor cycles, once every forty processor cycles, etc.). If the rate controller 139*b* currently forwarded a packet from the receive queue 129*b* to the virtualized network function 123*b* every ten processor cycles, it could adjust to the lower example rate of once very twenty processor cycles in response to receiving the decelerate signal. If another decelerate signal were later received, then the rate controller 139*b* could adjust to the next lower example rate of once every thirty processor cycles. As another example, the rate controller 139*b* could exponentially decrease the frequency at which it forwards packets from the receive queue 129*b* each time it receives a decelerate signal. For example, every time the rate controller 139*b* receives a decelerate signal, it could halve the frequency at which it forwards packets from the receive queue 129*b* to the virtualized network function 123*b*.

By decreasing the frequency at which packets are forwarded from the receive queue 129*b* to the virtualized network function 123*b*, the virtualized network function 123*b* will decrease the amount computing resources it consumes (e.g., by failing to spawn threads or kernels to process the packets). As a result, time slices or other computational resources that would be allocated to the virtualized network function 123*b* will be reallocated to other virtualized network functions 123 hosted on other virtual machines 119, thereby causing those other virtual machines 119 to more quickly process packets stored in their respective receive queues 129.

Figure 6:
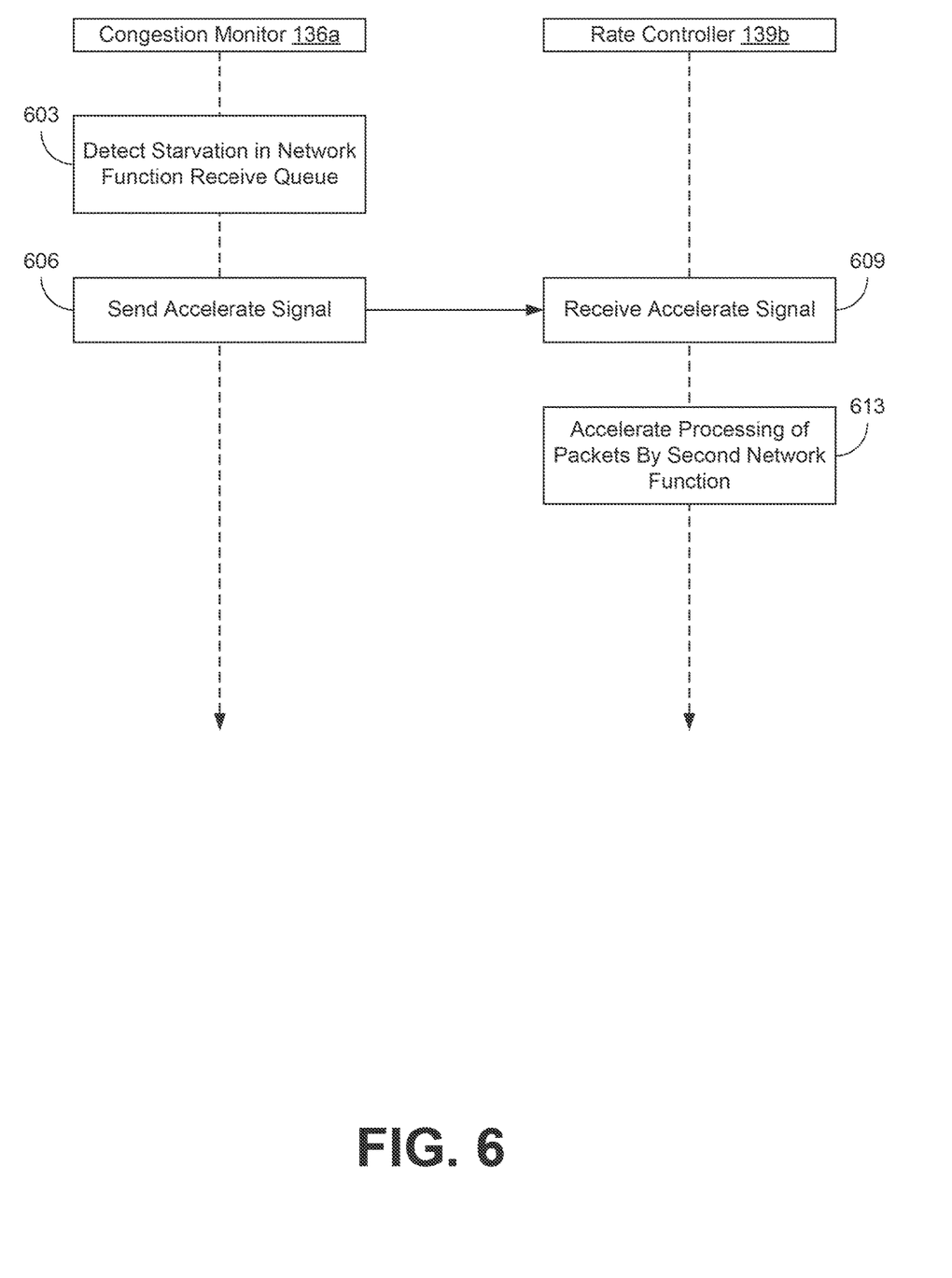

Referring next to FIG. 6, shown is a sequence diagram that provides one example of the interactions between the congestion monitor 136*a* of a first virtual machine 119*a* and a rate controller 139*b* of a second virtual machine 119*b*. The sequence diagram of FIG. 6 provides merely an example of the many different types of functional arrangements that can be employed to implement the interactions the congestion monitor 136*a* of a first virtual machine 119*a* and a rate controller 139*b* of a second virtual machine 119*b*. As an alternative, the sequence diagram of FIG. 6 can be viewed as depicting an example of elements of a method implemented within the host computing device 100.

Beginning with block 603, the congestion monitor 136*a* of a first virtual machine 119 a can detect a starvation condition in the receive queue 129*a* associated with a virtualized network function 123*a* implemented by the virtual machine 119*a*. For example, the congestion monitor 136*a* could periodically evaluate the receive queue 129*a* to determine the number of packets currently stored in the receive queue 129*a*. If the number of packets is lean than a predefined threshold value, the congestion monitor 136*a* could determine that the receive queue 129*a* is suffering from starvation.

In response to detecting starvation in the receive queue 129*a*, the congestion monitor 136*a* could send an accelerate signal to the rate controller 139*b* of a second virtual machine 119*b* at block 606. The accelerate signal could be any signal or message that, when received by the rate controller 139b of the second virtual machine 119b, would cause the rate controller 139b to increase the speed or frequency at which it forward packets from the receive queue 129b of the second virtual machine 119b to the virtualized network function 123b of the second virtual machine 119b. The accelerate signal could be sent using any one of a number of interprocess or inter-virtual machine communications mechanism. For example, the congestion monitor 136a could send a network packet or message through the virtual NIC 143a, which the hypervisor 116 could directly route of forward to the virtual NIC 143b of the second virtual machine 119b.

Accordingly, at block 609, the rate controller 139b executing on the second virtual machine 119b could receive the accelerate signal sent by the congestion monitor 136a of the first virtual machine 119a.

In response to receiving the accelerate signal at block 609, the rate controller 139b could, at block 613, increase the speed or frequency at which it forward packets from the receive queue 129b of the second virtual machine 119b to the virtualized network function 123b of the second virtual machine 119b.

For example, if the rate controller 139b offered different rates at which it forwarded packets from the receive queue 129b, then the rate controller 139b could move from a current rate of forwarding to a higher rate of forwarding. For example, the rate controller 139b could offer several different rates of forwarding (e.g., once every ten processor cycles, once every twenty processor cycles, once every thirty processor cycles, once every forty processor cycles, etc.). If the rate controller 139b currently forwarded a packet from the receive queue 129b to the virtualized network function 123b every thirty processor cycles, it could adjust to the higher example rate of once very twenty processor cycles in response to receiving the accelerate signal. If another accelerate signal were later received, then the rate controller 139b could adjust to the next higher example rate of once every ten processor cycles. As another example, the rate controller 139b could exponentially increase the frequency at which it forwards packets from the receive queue 129b each time it receives an accelerate signal. For example, every time the rate controller 139b receives an accelerate signal, it could increase the frequency at which it forwards packets from the receive queue 129b to the virtualized network function 123b by 25%, 50%, 75%, 100%, or some other predefined value.

By increasing the speed or frequency at which packets are forwarded from the receive queue 129b to the virtualized network function 123b, the virtualized network function 123b will use additional computing resources (e.g., by spawning additional threads or kernels to process the packets). As a result, time slices or other computational resources that would be allocated to other virtualized network functions 123 of other virtual machines 119 will be reallocated to the virtualized network function 123b. As a result, other virtualized network functions 123 of other virtual machines 119 will slow while the virtualized network function 123b of the virtual machine 119b will increase the speed at which it processes and forwards packets to the receive queue 129a of the virtual machine 119a.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

What is claimed is:

1. A system, comprising:
   a host computing device comprising a host processor and a host memory; and
   a hypervisor stored in the host memory and executed by the host processor to manage the execution of a first virtual machine and a second virtual machine by the host computing device, wherein:
   the first virtual machine comprises, a first virtualized network function, a receive queue, and a congestion monitor configured to at least:
   detect congestion in the receive queue; and
   send a pause signal to a rate controller executed by the second virtual machine; and
   the second virtual machine comprises a second virtualized network function comprising a transmit queue, and a rate controller configured to at least:
   receive the pause signal; and
   cause the second virtualized network function to pause processing of packets to reduce congestion in the receive queue; wherein:
   the first virtualized network function is implemented using a first virtualized accelerator card allocated to the first virtual machine, the first virtualized accelerator card virtualizing at least a portion of a host accelerator card of the host computing device;
   the second virtualized network function is implemented using a second virtualized accelerator card allocated to the second virtual machine, the second virtualized accelerator card virtualizing at least a portion of the host accelerator card of the host computing device; and
   pausing the processing of packets by the second virtualized network function causes the host computing device to reallocate a time-slice for the host accelerator card from the second virtualized network function to the first virtualized network function.

2. The system of claim 1, wherein
   the congestion monitor of the first virtual machine is further configured to at least:
   detect starvation in the receive queue; and
   send a resume signal to the rate controller executed by the second virtual machine; and
   the rate controller of the second virtual machine is further configured to at least:
   receive the resume signal; and
   cause the second virtualized network function to resume processing of packets to reduce starvation in the receive queue.

3. The system of claim 2, wherein the congestion monitor is configured to detect starvation in the receive queue of the first virtualized network function by at least:
   identifying a number of packets in the receive queue; and
   determining that the number of packets in the receive queue is less than a threshold number of packets.

4. The system of claim 1, wherein the congestion monitor is configured to detect congestion in the receive queue by at least:
   identifying, by the congestion monitor, a number of packets in the receive queue; and
   determining, by the congestion monitor, that the number of packets in the receive queue of the first virtualized network function exceeds a threshold number of packets.

5. The system of claim 1, wherein the host accelerator card is capable of general purpose computation.

6. The system of claim 1, wherein the first virtualized accelerator card is a first virtualized graphics processing unit (GPU), the second virtualized accelerator card is a second virtualized GPU, and the host accelerator card is a host GPU.

7. The system of claim 1, wherein the first virtualized network function is at least one of a virtual private network (VPN) endpoint, an intrusion detection system, or a routing system.

8. A method, comprising:
 detecting congestion, by a congestion monitor executed by a first virtual machine executed by a host computing device, in a receive queue associated with a first virtualized network function implemented by a first virtual machine;
 sending, by the congestion monitor executed by the first virtual machine executed by the host computing device, a pause signal to a rate controller executed by a second virtual machine executed by the host computing device;
 receiving, by the rate controller executed by the second virtual machine executed by the host computing device, the pause signal; and
 pausing, by the rate controller, processing of packets by a second virtualized network function implemented by the second virtual machine to reduce congestion in the receive queue of the first virtualized network function; wherein:
  the first virtualized network function is implemented using a first virtualized accelerator card allocated to the first virtual machine, the first virtualized accelerator card virtualizing at least a portion of a host accelerator card of the host computing device;
  the second virtualized network function is implemented using a second virtualized accelerator card allocated to the second virtual machine, the second virtualized accelerator card virtualizing at least a portion of the host accelerator card of the host computing device; and
  pausing the processing of packets by the second virtualized network function causes the host computing device to reallocate a time-slice for the host accelerator card from the second virtualized network function to the first virtualized network function.

9. The method of claim 8, further comprising:
 detecting starvation, by the congestion monitor executed by the first virtual machine, in the receive queue;
 sending, by the congestion monitor executed by the first virtual machine, a resume signal to the rate controller executed by the second virtual machine;
 receiving, by the rate controller executed by the second virtual machine, the resume signal; and
 resuming, by the rate controller, processing of packets with the second virtualized network function implemented by the second virtual machine to reduce starvation in the receive queue.

10. The method of claim 9, wherein detecting starvation, by the congestion monitor executed by the first virtual machine, in the receive queue further comprises:
 identifying, by the congestion monitor, a number of packets in the receive queue; and
 determining, by the congestion monitor, that the number of packets in the receive queue is less than a threshold number of packets.

11. The method of claim 8, wherein detecting congestion, by the congestion monitor executed by the first virtual machine, in the receive queue further comprises:
 identifying, by the congestion monitor, a number of packets in the receive queue; and
 determining, by the congestion monitor, that the number of packets in the receive queue exceeds a threshold number of packets.

12. The method of claim 8, wherein the host accelerator card is capable of general purpose computation.

13. The method of claim 8, wherein the first virtualized accelerator card is a first virtualized graphics processing unit (GPU), the second virtualized accelerator card is a second virtualized GPU, and the host accelerator card is a host GPU.

14. The method of claim 8, wherein the first virtualized network function is at least one of a virtual private network (VPN) endpoint, an intrusion detection system, or a routing system.

15. A non-transitory, computer-readable medium, comprising machine-readable instructions that, when executed by a processor of a host computing device, cause the computing device to at least:
 detect congestion, with a congestion monitor executed by a first virtual machine executed by the host computing device, in a receive queue associated with a first virtualized network function implemented by a first virtual machine;
 send, with the congestion monitor executed by the first virtual machine executed by the host computing device, a pause signal to a rate controller executed by a second virtual machine executed by the host computing device;
 receive, by the rate controller executed by the second virtual machine executed by the host computing device, the pause signal; and
 pause, by the rate controller, processing of packets by a second virtualized network function implemented by the second virtual machine to reduce congestion in the receive queue of the first virtualized network function; wherein:
  the first virtualized network function is implemented using a first virtualized accelerator card allocated to the first virtual machine, the first virtualized accelerator card virtualizing at least a portion of a host accelerator card of the host computing device;
  the second virtualized network function is implemented using a second virtualized accelerator card allocated to the second virtual machine, the second virtualized accelerator card virtualizing at least a portion of the host accelerator card of the host computing device; and
  pausing the processing of packets by the second virtualized network function causes the host computing device to reallocate a time-slice for the host accelerator card from the second virtualized network function to the first virtualized network function.

16. The non-transitory, computer-readable medium of claim 15, wherein the machine-readable instructions, when executed by the processor, further cause the host computing device to at least:
 detect starvation, by the congestion monitor executed by the first virtual machine, in the receive queue;
 send, by the congestion monitor executed by the first virtual machine, a resume signal to the rate controller executed by the second virtual machine;
 receive, by the rate controller executed by the second virtual machine, the resume signal; and
 resume, by the rate controller, processing of packets with the second virtualized network function implemented by the second virtual machine to reduce starvation in the receive queue.

17. The non-transitory, computer-readable medium of claim 16, wherein detecting starvation, by the congestion monitor executed by the first virtual machine, in the receive queue further comprises causing the host computing device to at least:

identify, by the congestion monitor, a number of packets in the receive queue; and determine, by the congestion monitor, that the number of packets in the receive queue is less than a threshold number of packets.

18. The non-transitory, computer-readable medium of claim 15, wherein detecting congestion, by the congestion monitor executed by the first virtual machine, in the receive queue further comprises:

identifying, by the congestion monitor, a number of packets in the receive queue; and determining, by the congestion monitor, that the number of packets in the receive queue exceeds a threshold number of packets.

19. The non-transitory, computer-readable medium of claim 15, wherein the host accelerator card is capable of general purpose computation.

20. The non-transitory, computer-readable medium of claim 15, wherein the first virtualized accelerator card is a first virtualized graphics processing unit (GPU), the second virtualized accelerator card is a second virtualized GPU, and the host accelerator card is a host GPU.

* * * * *